July 16, 1963  F. LANGER  3,097,668
METAL-COATED PLASTICS
Filed Nov. 16, 1959

Inventor:
Fritz Langer
By Michael S. Striker
Attorney

United States Patent Office 3,097,668
Patented July 16, 1963

3,097,668
METAL-COATED PLASTICS
Fritz Langer, Hamburg, Germany, assignor to Asbest-
und Gummiwerke Martin Merkel K.G., Hamburg-
Wilhelmsburg, Germany
Filed Nov. 16, 1959, Ser. No. 853,221
Claims priority, application Germany Nov. 15, 1958
3 Claims. (Cl. 138—145)

This invention relates to a process for applying a metal coat to a plastic material derived from a perhalogeno hydrocarbon and to the composite structures thus produced. More particularly, the present invention is concerned with metal-coated perfluoro hydrocarbon plastics and with various shaped articles comprising such a plastic and a metal coat applied thereto. The present invention pertains also to a process for metal-coating shaped articles made of perfluoro hydrocarbons including articles defined by curved surfaces.

It is well known that plastics derived from perhalogeno hydrocarbons, in particular from perfluoro hydrocarbons, such as polytetrafluoroethylene, available commercially as Teflon, have a very poor adhesion to other materials. Numerous publications relating to this type of plastics mention the low adhesion of these new materials of construction to other materials.

It is also known that perhalogeno hydrocarbon plastics are very stable to chemically aggressive materials. In view of their chemical stability, the perhalogeno hydrocarbon plastics, such as polytetrafluoroethylene, are used to an ever-increasing extent in the construction of equipment for the chemical industry including hollow bodies such as pipes, T's, elbows, undulated hoses, bellows joints and containers.

However, articles produced from perhalogeno hydrocarbon plastics possess only a very limited compressive strength. Although the mechanical stability of such articles will depend upon the thickness of their walls, the fact remains that for example polytetrafluoroethylene has a tensile strength as low as 200 to 300 kg./cm.$^2$ and an ultimate elongation (elongation at break) as low as 300 to 500%. The mechanical stability of polyhalogeno hydrocarbon plastics is even lower at elevated temperatures and drops at 280° C. to a point where these plastics can no longer be used if they are to withstand appreciable pressures.

Attempts have therefore been made to reinforce hollow articles produced from polyhalogeno hydrocarbon plastics. Among the methods heretofore used to impart additional strength to such articles are the insertion of polytetrafluoro ethylene pipes into steel pipes, the enclosure of T's and other pipe fittings made from such plastics by half-shells and a reinforcement with glass, asbestos or metallic fibers in the case of bellow joints. However, the results obtained by these prior art methods are unsatisfactory. Thus, shaped articles produced from perhalogeno hydrocarbon plastics which are enclosed by steel pipes or half-shells tend to become deformed when a vacuum is applied thereto inasmuch as hollow spaces between the plastic material and the exterior covering cannot be avoided. On the other hand, the reinforcement by fibers or fabrics generally necessitates the use of a bonding agent, which in the majority of cases is of insufficient thermal stability.

A theoretical possibility for the reinforcement of perhalogeno hydrocarbon plastics would be the application of a metal coat to their surface. Such a metal coat should not have the disadvantages of the above mentioned metal enclosures or fabric inserts. As a matter of fact, it has been proposed to apply a metal coat to plane articles of polytetrafluoroethylene by metallic spraying. In carrying out this process, the metal in the form of a wire or strip may be fed through a flame and from there projected onto the surface which is required to be coated. An adherence of the metal coat to the polytetrafluoroethylene article is achieved in this method due to the fact that the metal particles penetrate into the plastic material and become anchored therein. However, coating by metallic spraying has the disadvantage that the surface of the perhalogeno hydrocarbon plastic is attacked by the metal particles on account of the high melting temperature of the latter. Thus, in the case of thin-walled articles, the metal particles directed against the wall may pierce the same. Furthermore, many metals do not lend themselves to the metallc spraying operation. Therefore, metallic spraying has not been adopted in practice to reinforce perhalogeno hydrocarbon plastics. However, even if practically feasible metallic spraying would not be applicable to articles having curved surfaces since it would be impossible to coat such articles with a uniform layer of the metal by spraying. Among the articles which could not be metal-coated by spraying are bellows joints characterized by parallel surfaces lying closely together.

According to another proposal, the metal is evaporated in vacuo and the plastic article to be coated is exposed to the metal vapor. However, this process has the disadvantage of resulting in a thin metal layer of insufficient mechanical stability.

It is a primary object of the present invention to provide an improved process for metal-coating perhalogeno hydrocarbon plastics.

Another object of the present invention is to provide a metal-coating process which is applicable to shaped articles made of perhalogeno hydrocarbon plastics including hollow bodies, such as pipes, T's, elbows, bellows joints and containers.

A further object of the present invention is to provide perhalogeno hydrocarbon plastics having a reinforcing metal coat.

Yet another object of the present invention is to provide shaped articles comprising a perhalogeno hydrocarbon plastic and a metal coat applied thereto which are suitable for use in the construction of chemical equipment.

A still further object of the present invention is to provide composite articles comprising a plastic material derived from a perhalogeno hydrocarbon and a reinforcing metal coat, the bond between said plastic material and said metal coat being such as to permit movements of the metal coat with respect to the surface of the plastic material.

With the above objects in view, the present invention provides a process for reinforcing perhalogeno hydrocarbon plastics which comprises applying a thin cover layer of a conductive material to the surface of the perhalogeno hydrocarbon plastic to be reinforced, and subsequently coating the layer of conductive material with an exterior metal layer by galvanization. The process of the invention results in a composite structure comprising a perhalogeno hydrocarbon plastic base, an intermediate conductor layer adjacent to the plastic base and an exterior metal layer positioned on the intermediate conductor layer.

In a specific embodiment of the present invention, a shaped article made of polytetrafluoroethylene, such as a pipe, T, elbow, bellows joint or container, is reinforced by applying a thin layer of a conductor to the surface of the shaped article and subsequently coating the conductor layer with a metal layer by galvanization.

The intermediate conductor layer contained in the composite articles of this invention does not firmly adhere to the surface of the plastic base. As a result, the metal layer galvanized onto the intermediate conductor layer is not firmly bonded to the plastic material. However, contrary to all expectations, the adhesion of the conductor layer to the plastic base is sufficient to permit the application of a satisfactory exterior metal coat by galvanization methods.

Prior to the present invention, it was believed necessary to firmly bond a metal coat, in particular a metal coat produced by galvanization, to the supporting material. Therefore, only those materials were galvanized which were likely to form a firm bond with the metal coat. In other words, the galvanization of materials not adhering firmly to metals was believed to produce unsatisfactory results.

The present invention overcomes this prejudice of the prior art. What is more important, it has surprisingly been found that what was considered to be disadvantageous, i.e. the lack of a firm bond between the plastic material and the metal coat applied thereto by galvanization, is in fact a definite advantage.

In view of the lack of a firm adhesion of the metal coat to the perhalogeno hydrocarbon plastic, movements of the metal coat with respect to the surface of the plastic base are possible in the composite articles of this invention. As a result, damage to the metal layer caused by a difference between the coefficients of expansion of metal and plastic is avoided. In such articles as bellows joints made according to this invention, the plastic material in the interior can move somewhat without the exterior metal coat participating in the movements of the plastic base. In this manner, a deterioration of the mechanical characteristics of the metal layer due to fatigue is eliminated.

In a preferred embodiment of the present invention, the conductor layer is made of conductor silver as used in the printing of electrical circuits. However, good results are also obtained if the conductive layer is formed by the application of graphite or by the evaporation of a metal such as silver on the plastic object to be metallized.

The application of the exterior metal layer may be effected by any conventional galvanization method although it is generally preferred to apply the exterior metal layer by electro-galvanizing, for instance by the electroplating processes described in the handbook "Principles and Applications of Electro-Chemistry," by W. A. Koehler, pages 95 to 158.

Depending upon the pressure-, corrosion- and temperature resistance desired, the exterior metal layer of the composite polyperhalogeno hydrocarbon articles of this invention may be formed from any of a great variety of metals. It is also within the purview of this invention to apply a plurality of protective coats consisting of different metals to an article made from a polyperhalogeno hydrocarbon. Thus, one of the applied metal coats may serve to increase the mechanical strength of the object while another metal coat may bring about corrosion resistance.

The invention is illustrated in the accompanying drawing, in which.

Figure 1:
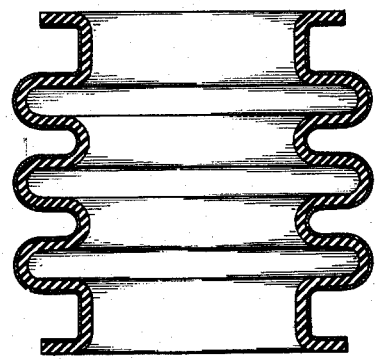
FIG. 1 is a vertical sectional view of a bellows joint made according to the present invention.
Figure 2:
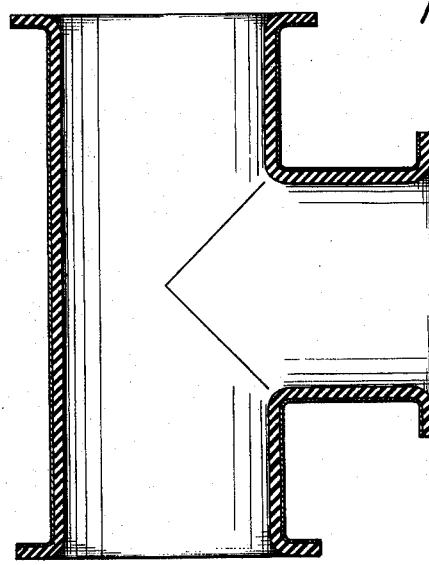
FIG. 2 is a vertical sectional view through a T embodying the present invention.
Figure 3:
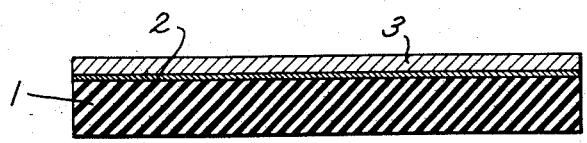
FIG. 3 is a sectional view, on an enlarged scale, through a wall of an article made in accordance with the present invention.

Referring more particularly to FIG. 3, the numeral 1 designates a plastic base made of polytetrafluoroethylene, reference character 2 indicates the intermediate conductor layer and numeral 3 designates the exterior metal layer deposited on the intermediate layer 2 by galvanization.

While the invention has been illustrated and described in the specification, it is not intended to be limited to the details shown since various modifications may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A composite structure, comprising, in combination, a Teflon base; a relatively thin intermediate conductive coating enveloping said Teflon base, contacting the same without firmly adhering thereto; and a relatively thick exterior metal layer integral with said intermediate conductive coating.

2. A shaped article, comprising, in combination, a Teflon base; a relatively thin intermediate conductive coating consisting essentially of a material selected from the group consisting of silver and graphite enveloping said Teflon base, contacting the same without firmly adhering thereto; and a relatively thick exterior metal layer integral with said intermediate conductive coating.

3. A pipe fitting defined by curved and intersecting surfaces which has a wall comprising, in combination, a Teflon base; a relatively thin intermediate conductive coating enveloping said Teflon base, contacting the same without firmly adhering thereto; and a relatively thick exterior metal layer integral with said intermediate conductive coating, whereby said Teflon base of said wall will be reinforced by said metal layer while the latter remains movable relative to said Teflon base.

References Cited in the file of this patent

UNITED STATES PATENTS

| | | |
|---|---|---|
| 1,126,211 | Heller | Jan. 26, 1915 |
| 2,424,583 | Rahm | July 29, 1947 |
| 2,454,610 | Narcus | Nov. 23, 1948 |
| 2,768,133 | Lundbye | Oct. 23, 1956 |
| 2,923,651 | Petriello | Feb. 2, 1960 |